(12) United States Patent
Xie et al.

(10) Patent No.: US 11,143,639 B2
(45) Date of Patent: Oct. 12, 2021

(54) INTEGRATED COLUMN AND DETECTOR IN A MODULE FOR LIQUID CHROMATOGRAPHY

(71) Applicant: Brigham Young University, Provo, UT (US)

(72) Inventors: Xiaofeng Xie, Provo, UT (US); Luke T. Tolley, Mapleton, UT (US); Paul B. Farnsworth, Orem, UT (US); H. Dennis Tolley, Mapleton, UT (US); Milton L. Lee, Pleasant Grove, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 128 days.

(21) Appl. No.: 16/286,562

(22) Filed: Feb. 26, 2019

(65) Prior Publication Data
US 2019/0265215 A1    Aug. 29, 2019

Related U.S. Application Data

(60) Provisional application No. 62/635,418, filed on Feb. 26, 2018.

(51) Int. Cl.
*G01N 30/88* (2006.01)
*G01N 30/78* (2006.01)
*G01N 30/02* (2006.01)

(52) U.S. Cl.
CPC .............. *G01N 30/88* (2013.01); *G01N 30/78* (2013.01); *G01N 2030/027* (2013.01); *G01N 2030/8881* (2013.01)

(58) Field of Classification Search
CPC .. G01N 30/00–04; G01N 30/78; G01N 30/88; G01N 2030/027; G01N 2030/8881
See application file for complete search history.

(56) References Cited

U.S. PATENT DOCUMENTS

| | | | |
|---|---|---|---|
| 6,641,783 B1 | 11/2003 | Pidgeon et al. | |
| 8,496,818 B2* | 7/2013 | Benevides | G01N 30/6091 210/198.2 |
| 8,641,882 B2 | 2/2014 | Jarrell et al. | |
| 8,794,676 B2* | 8/2014 | Murphy | B01L 3/565 285/332.1 |
| 9,188,573 B2* | 11/2015 | Liu | G01N 30/96 |
| 9,211,520 B2 | 12/2015 | Satyamurthy et al. | |
| 10,338,038 B2* | 7/2019 | Kirby | F16L 19/00 |

(Continued)

*Primary Examiner* — Nguyen Q. Ha
(74) *Attorney, Agent, or Firm* — Morriss O'Bryant Compagni Cannon, PLLC

(57) ABSTRACT

A system and method for separating the functions of a liquid chromatography (LC) system into physically separate systems that allow for a more versatile LC system, wherein an LC device provides column 50 a liquid solvent, a sample, and a pump and injector that pushes the sample in the solvent to an output port, and providing an attachable module containing a module input port, a column, a heater for the column, and at least one detector for on-column detection, then attaching the module to the LC device using a press-fit connection that enables the sample in the solvent to be pumped through the column to the at least one detector in order to separate, identify and quantify substances in the sample and transmit results from the at least one detector to the LC system for collection and analysis.

15 Claims, 14 Drawing Sheets

(56) References Cited

U.S. PATENT DOCUMENTS

| | | | |
|---|---|---|---|
| 2011/0100100 A1* | 5/2011 | Strand | G01N 27/44704 73/61.58 |
| 2013/0134083 A1* | 5/2013 | Benevides | G01N 30/6039 210/198.2 |
| 2013/0206653 A1* | 8/2013 | Brann | G01N 30/461 210/85 |
| 2014/0217196 A1 | 8/2014 | Prentice | |

* cited by examiner

INTEGRATED COLUMN AND DETECTOR IN A MODULE FOR LIQUID CHROMATOGRAPHY

BACKGROUND

Description of Related Art

Liquid chromatography (LC) is performed in order to analyze the chemicals in a liquid solution. FIG. 1 is a block diagram of components that may be part of an LC system in the prior art that may include but should not be considered as limited to a container of solvent 10, a pump 12, an injector 14, a sample 16, a column 18, a heater 20, a detector 22 and a device for data acquisition 24. Other components may also be needed, and the arrangement of specific components may be modified from that shown, but typically these components are used in an LC system.

The function of the LC system may proceed as follows. An LC system may use a pump to pass a pressurized liquid solvent containing a sample mixture through a column filled with a solid sorbent material. Each component in the sample interacts slightly differently with the sorbent material, thereby causing different migration rates for the different substances within the sample and leading to the separation of the substances as they flow out of the column.

When these instrumental components are being used in either a laboratory or portable setting, the state of the art requires that physical connections be made between the various components of the system. For example, consider the diagram shown in FIG. 2. FIG. 2 shows that there is a connection 30 between the injector 14 and the column 18.

The prior art has typically used a nut, ferrule and threaded screw to make the connection 30 between the injector 14 and the column 18.

It would be an advantage over the prior art to have a system and method for making connections between various components in an LC system that would not require the use of tools to make the connections. It would be a further advantage to have a system and method that did not rely on a user's judgement as to when a connection between components was made correctly. It would be another advantage over the prior art to have a connection that does not rely on a twisting motion to make the connection between components. It would be another advantage over the prior art to have a connection system that could not be overtightened or under-tightened but would always provide the same consistent connection each time, regardless of the skill of the user or the suitability of the tools available to the user. It would be another advantage to have a connection between components that is repeatable without the user having to make a judgement that relies on a correct and consistent amount of torque being applied to the connection.

BRIEF SUMMARY

The present invention is a system and method for separating the functions of a liquid chromatography (LC) system into physically separate systems that allow for a more versatile LC system, wherein an LC device provides a liquid solvent, a sample, and a pump and injector that pushes the sample in the solvent to an output port, and provides an attachable module containing a module input port, a column, and at least one detector for on-column detection, then attaching the module to the LC device using a press-fit connection that enables the sample in the solvent to be pumped through the column to least one detector in order to separate, identify and quantify substances in the sample and transmit results from the at least one detector to the LC system for collection and analysis.

These and other embodiments of the present invention will become apparent to those skilled in the art from a consideration of the following detailed description taken in combination with the accompanying drawings.

DETAILED DESCRIPTION

Reference will now be made to the drawings in which the various embodiments of the present invention will be given numerical designations and in which the embodiments will be discussed so as to enable one skilled in the art to make and use the invention. It is to be understood that the following description illustrates embodiments of the present invention, and should not be viewed as narrowing the claims which follow.

It should be understood that the present invention may be usable with a liquid chromatography (LC) system for separating, identifying and quantifying each component in a sample mixture. In the state of the art, an LC system brings together various components in a single device, wherein the components are connected to each other using various manually tightened connections such as nuts, ferrules and threaded connectors. These connections between the various components are relatively small and require great care so as to not damage the connectors when assembling the LC system.

Because an LC system is utilizing a fluid, it is also critical that any connections between various components of the LC system are secure from leaks so there is no loss of fluid. However, reliability and repeatability of connections will always be an issue when the connections rely on a user's fingers and thumb to tighten a nut on a threaded connector, when the tightness of the connection is dependent on a user's judgement.

In other words, if a user must twist a nut onto a threaded connector as is done in the prior art, the user may overtighten the connection and damage it, or the user may under-tighten the connection and allow fluid to escape. Unfortunately, the connections being made are relatively small and therefore difficult to judge accurately, which may result in damaged equipment and inaccurate results. Furthermore, the threaded connector may eventually wear out and become stripped, thereby shortening the life of the system.

Figure 1:
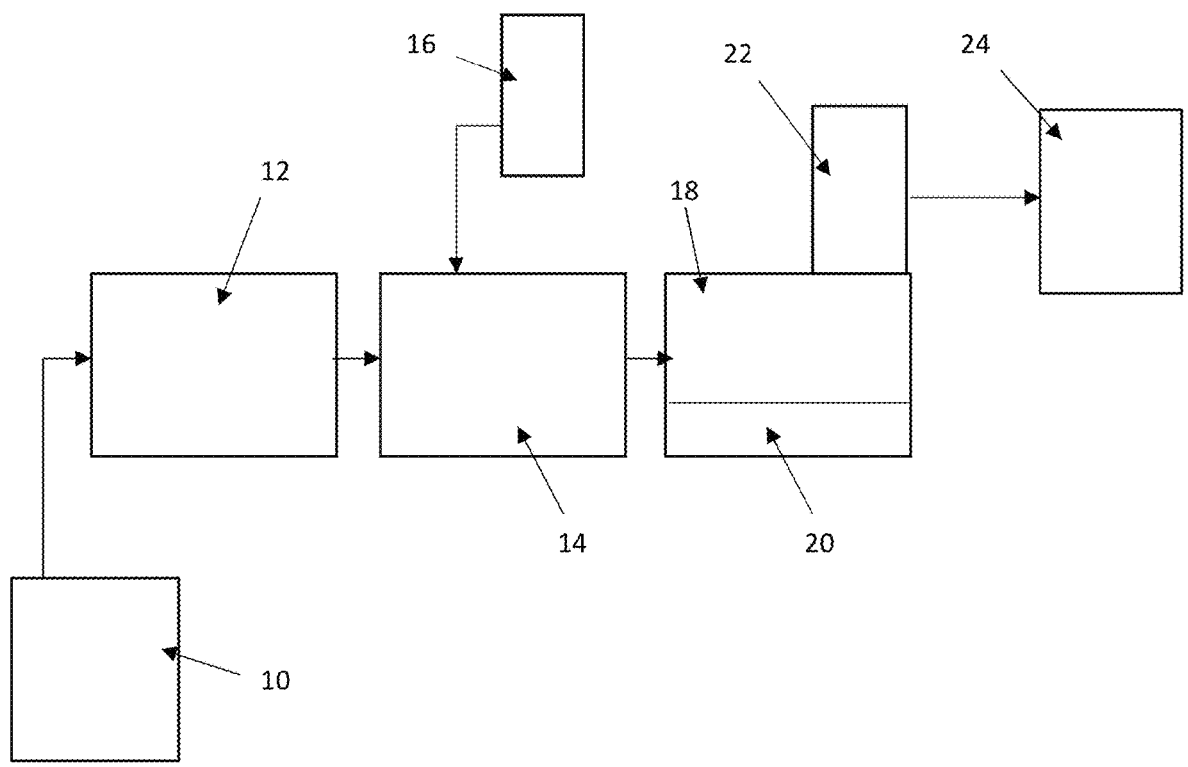
FIG. 1 is a block diagram of components that may be part of a liquid chromatography system of the prior art.
Figure 2:
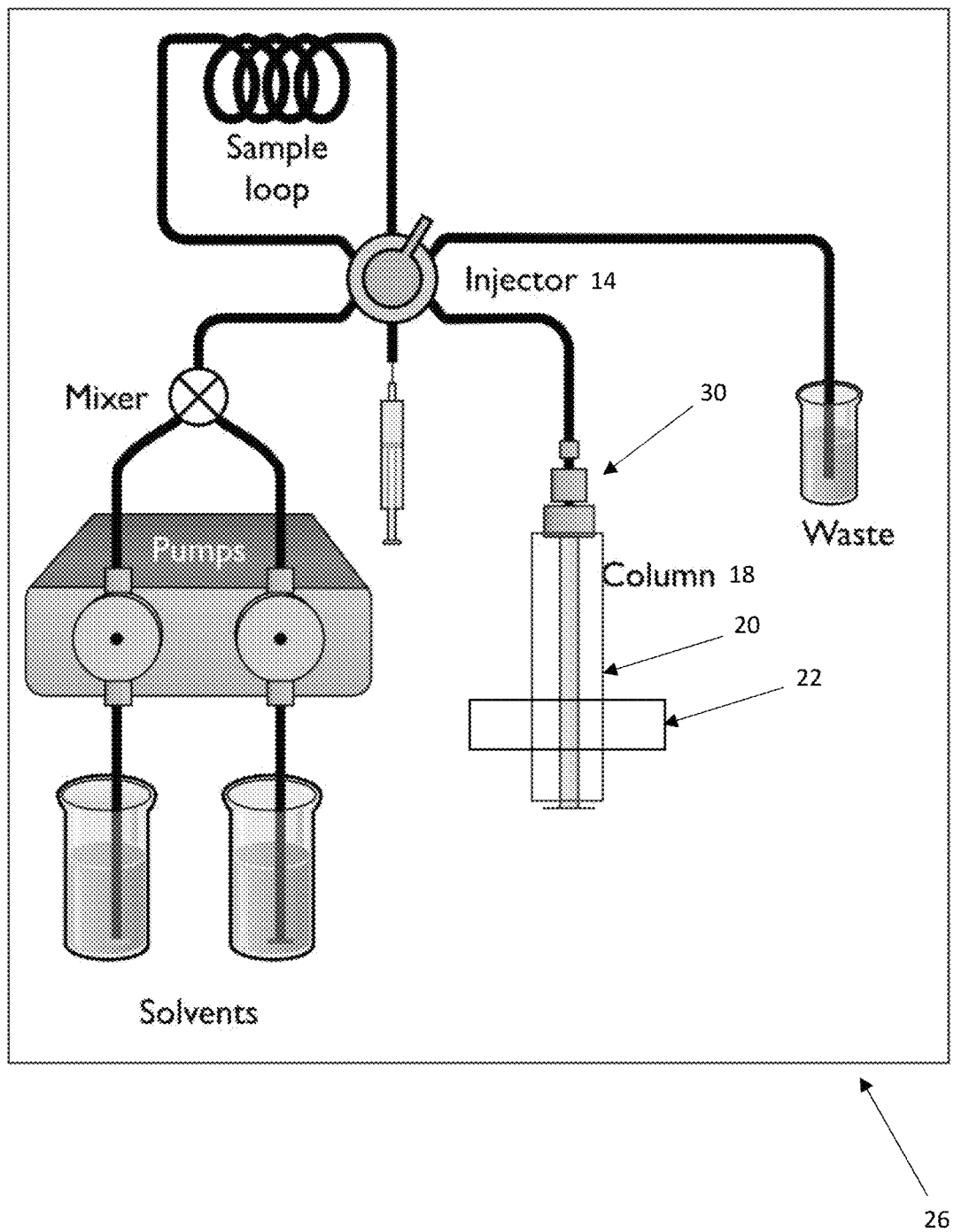
FIG. 2 is a diagram showing a prior art liquid chromatography system that requires manual connections to be made between various components of the LC system.

For example, consider the connection 30 that must be made in the prior art LC system 26 shown in FIG. 2 between the injector 14 and the column 18. This connection 30 may include a nut, ferrule and a corresponding threaded connector. When the size of the nut, ferrule and the threaded connector are relatively small, the nut, ferrule and/or the threaded connector may be easily damaged by overtightening.

Furthermore, overtightening a connector is also easy to do when working with very small tools. Thus, the user is left with having to "feel" how tight a connection is being made. Thus, the reliability of a connection is a subjective task that is left to the widely variable sensitivity of a user's fingers and thumb. Such a connection system is often unrepeatable, undependable and prone to damage.

In a first aspect of the invention, it would be an advantage over the prior art to provide a connection system that is consistently repeatable and thus does not rely on the user's ability to feel the relative tightness of a nut on a threaded connector.

In a second aspect of the invention, certain components of an LC system are physically separated from each other in order to increase versatility of the LC system. The LC system may be separated into an LC device that prepares, pumps and injects a sample to be evaluated, and a module containing a column, heater and at least one detector that separates, identifies and quantifies the substances in the sample. A first advantage of the module is that the components performing the separating, identifying and quantifying are disposed in the separate module that may be rapidly replaced with components having different measuring capabilities.

Figure 3:
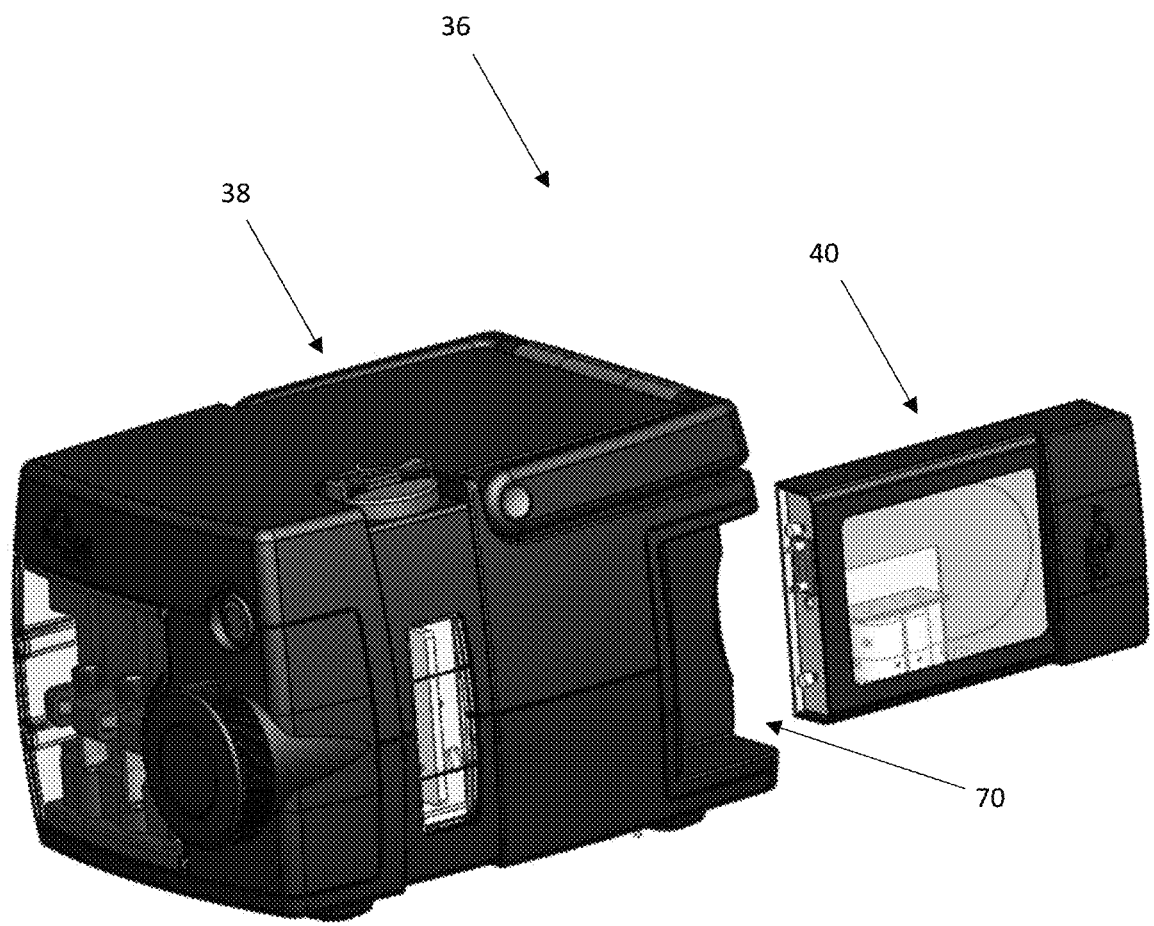
FIG. 3 is a perspective view of an LC system of the present invention that includes an LC device and a replaceable module, wherein the module includes a column and at least one detector.

The first and second aspects of the invention may be realized in an LC system that uses a replaceable module as shown in FIG. 3. FIG. 3 is perspective view of a first embodiment of the present invention showing an LC system 36 including an LC device 38 and a module 40. The LC device 38 may include some components such as a pump, a pump reservoir for solvents, an injector, a sample and a battery. The LC device 38 may include fewer components or may also include additional components and should not be considered as limited to the components described above.

The LC system 36 also includes the module 40. The module 40 may include a housing that enables the module to be attached to the LC device 38, and to protect components disposed within the module.

The connection system between the LC device 38 and the module 40 is a critical aspect of the invention. In order to provide a reliable and repeatable connection system, a slot 70 is provided in the LC device 38 to enable pre-alignment between the LC device 38 and the module 40 to safely guide the module to connection points on the LC device. The slot 70 also enables the connection points of the LC device 38 and the module 40 to meet in a straight on approach. It should be understood that the slot 70 may be constructed by any convenient means such as a guide rail or multiple rails and should not be considered as limited by the examples given.

Figure 4:
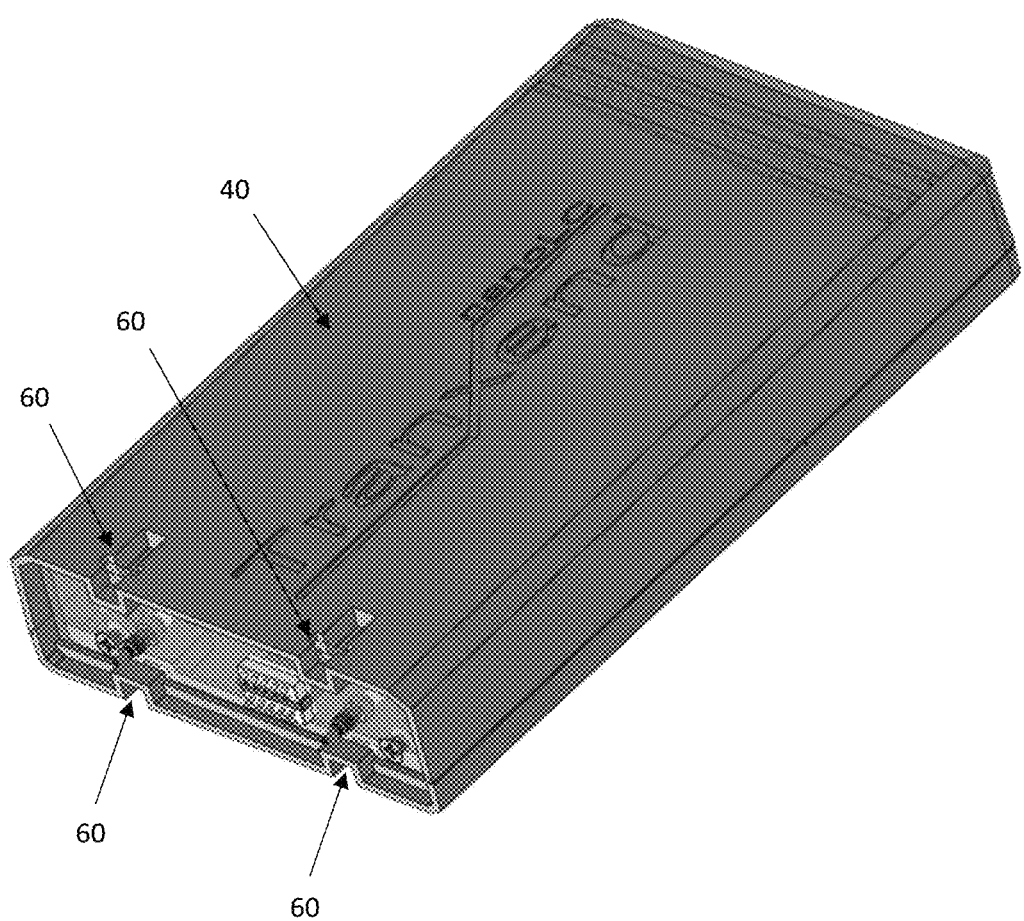
FIG. 4 is a perspective view of a module showing a housing and connection ports.

Before describing these connection points in more detail, it is useful to describe the module 40. FIG. 4 is a perspective view of a first embodiment of a module 40 that is constructed in accordance with the aspects of the invention, with a cover over the components that are disposed inside.

The housing of the module 40 may be used to attach the module against the LC device 38, but it should be understood that the attachment points are not being relied upon for making a leak-free press-fit connection. For example, the LC device 38 may have corresponding latches that engage a plurality of latch ports 60 shown in the module 40.

Figure 5:
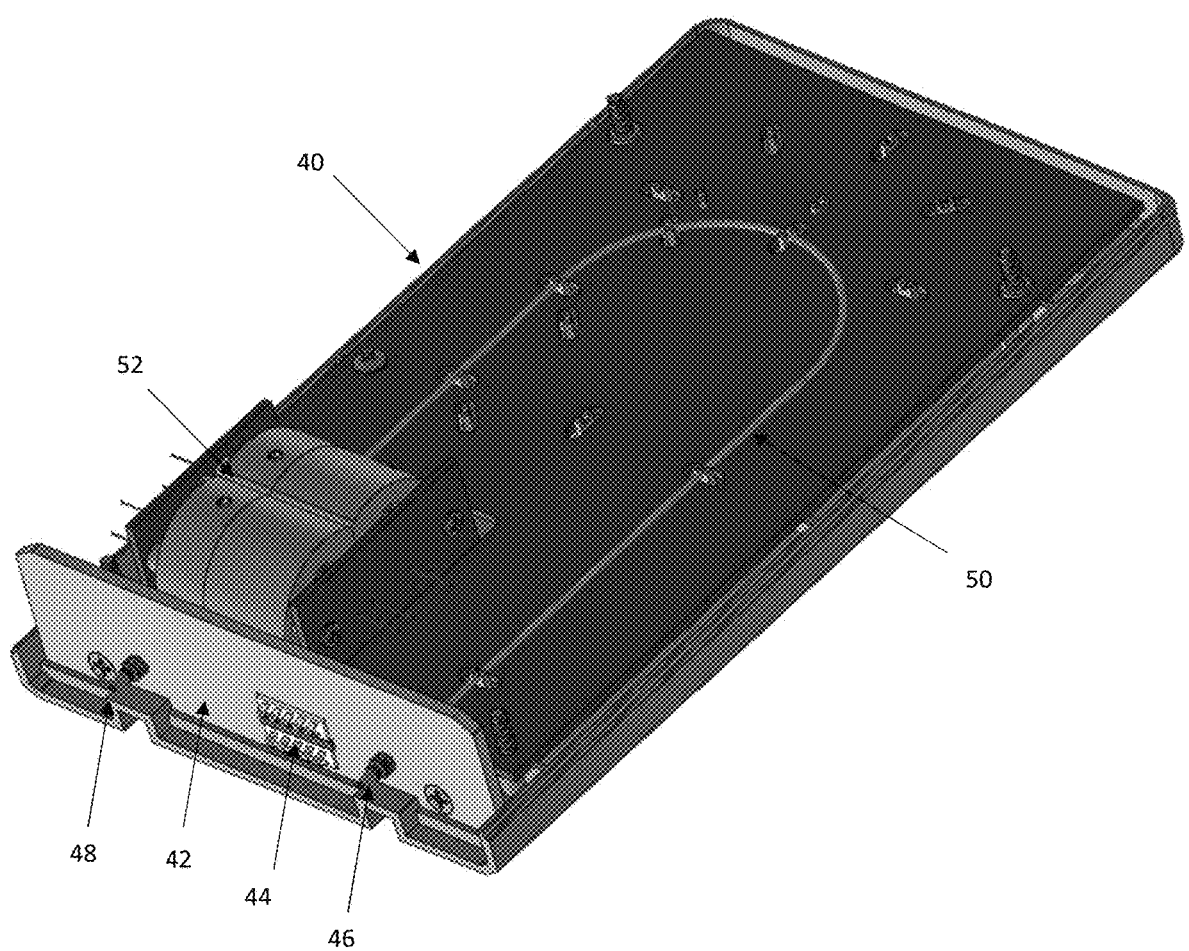
FIG. 5 is a same perspective view as shown in FIG. 4 but with a portion of the housing removed to illustrate a first embodiment for an arrangement of a column, two detectors for performing on-column detection, and connection ports.

FIG. 5 is a perspective view of a first embodiment of the present invention with the cover removed to show a first arrangement of components inside the module 40. The module 40 may include a connection end 42 that is seated against a corresponding connection end of the LC device 38. FIG. 5 also shows a column 50 that is curved towards two tandem on-column detectors 52. The curvature of the column 50 enables a longer column 50 to be used within a shorter module 40.

It should be understood that the length of the column 50 is adjustable by replacing the entire module 40, and not the column itself. In other words, by replacing a first module 40 with a second module, columns 50 of different lengths and/or columns with different packing materials may be used with the same LC device 38. However, instead of having to perform the difficult task of replacing a column 50 in the LC device 38, only the module 40 has to be replaced. Nevertheless, it should be understood that if desired, the column 50 may be replaced in a module.

The connection end 42 of the module 40 may also include a first electrical port 44, a module input port 46 that is coupled to the column 50, and a module output port 48 that is also coupled to the column. While these specific electrical ports 44 and fluid ports 46, 48 are shown in this embodiment, other ports may be provided as necessary in other embodiments of modules 40, and the invention should not be considered as limited to the number or type of ports that are shown. It should also be understood that the module output port 48 may be directed back into the LC device 38 for the collection of sample fluid from the column 50.

The module input port 46 and the fluid output port 48 on the module 40 are normally open ports. Likewise, the corresponding ports on the LC device 38 are also normally open. The module input port 46 is aligned with a corresponding output port on the LC device 38 and the module output port 48 is aligned with a corresponding input port on the LC device. The LC device 38 may also have a connection dock with a corresponding electrical connection for attachment to the module 40.

When making a connection between ports in the connection dock of the LC device 38 and the module 40, it should be understood that any introduction of empty space or dead volume between the output port of the LC device and the module input port 46 of the module should be avoided. Dead volume may decrease efficiency of measurements by causing peaks to become broader. The press-fit connection of the embodiments of the invention provides not only a fluid-tight seal, but unlike the prior art, may also prevent the introduction of dead space prior to the column 50 by having a form fitting connection that does not produce air gaps between connections.

Figure 6:
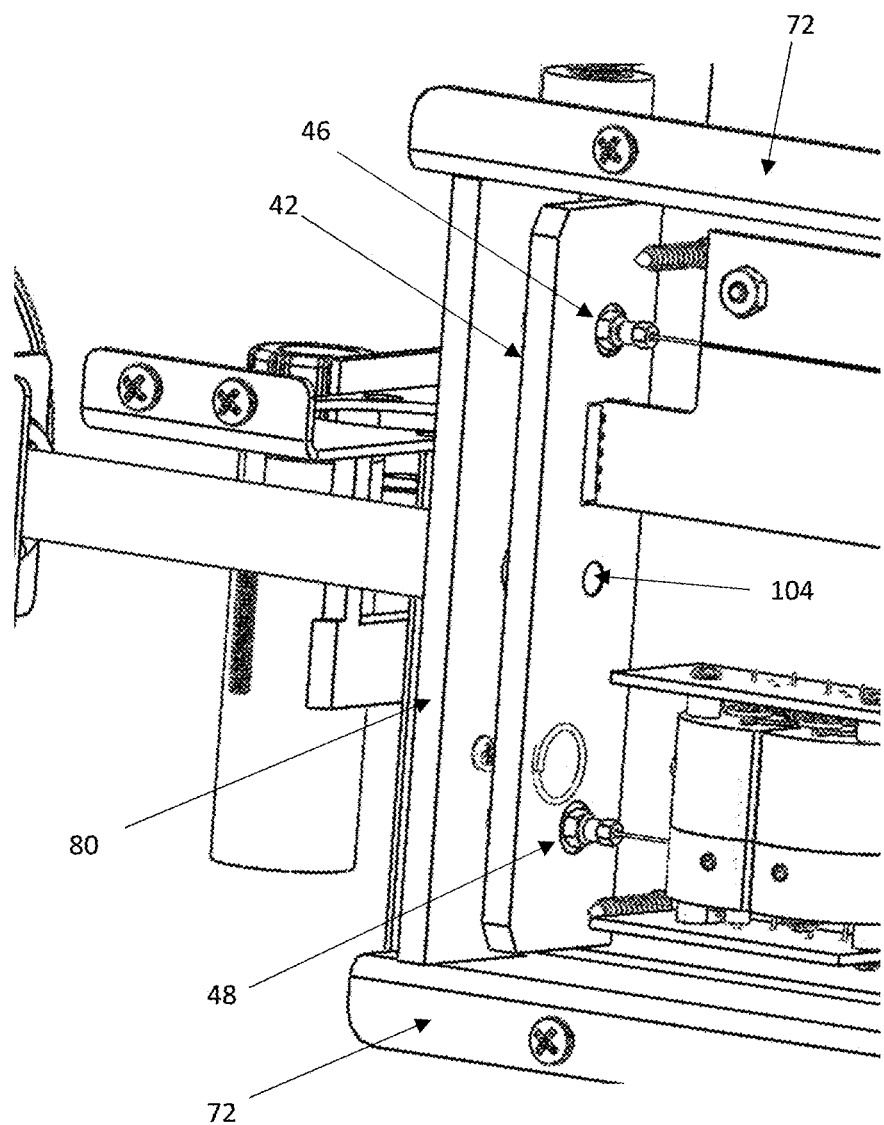
FIG. 6 is a perspective and exposed view of the slot within the LC device for the module and showing an internal view of ports within the module and a connection dock of the LC device.

FIG. 6 is a perspective view of the slot 70 formed by guide rails 72 within the LC device 38. The connecting end 42 of the module 40 is shown pressing against the connection dock 80 of the LC device 38. A portion of the module input port 46 and the module output port 48 are also visible. It should be emphasized that the guide rails 72 are only one means for guiding the module 40 when connecting it to the LC device 38. For example, guide rails may not be required at all if the module is not seated within the LC device 38. Alternatively, a single guide rail or some other device may be used.

Figure 7:
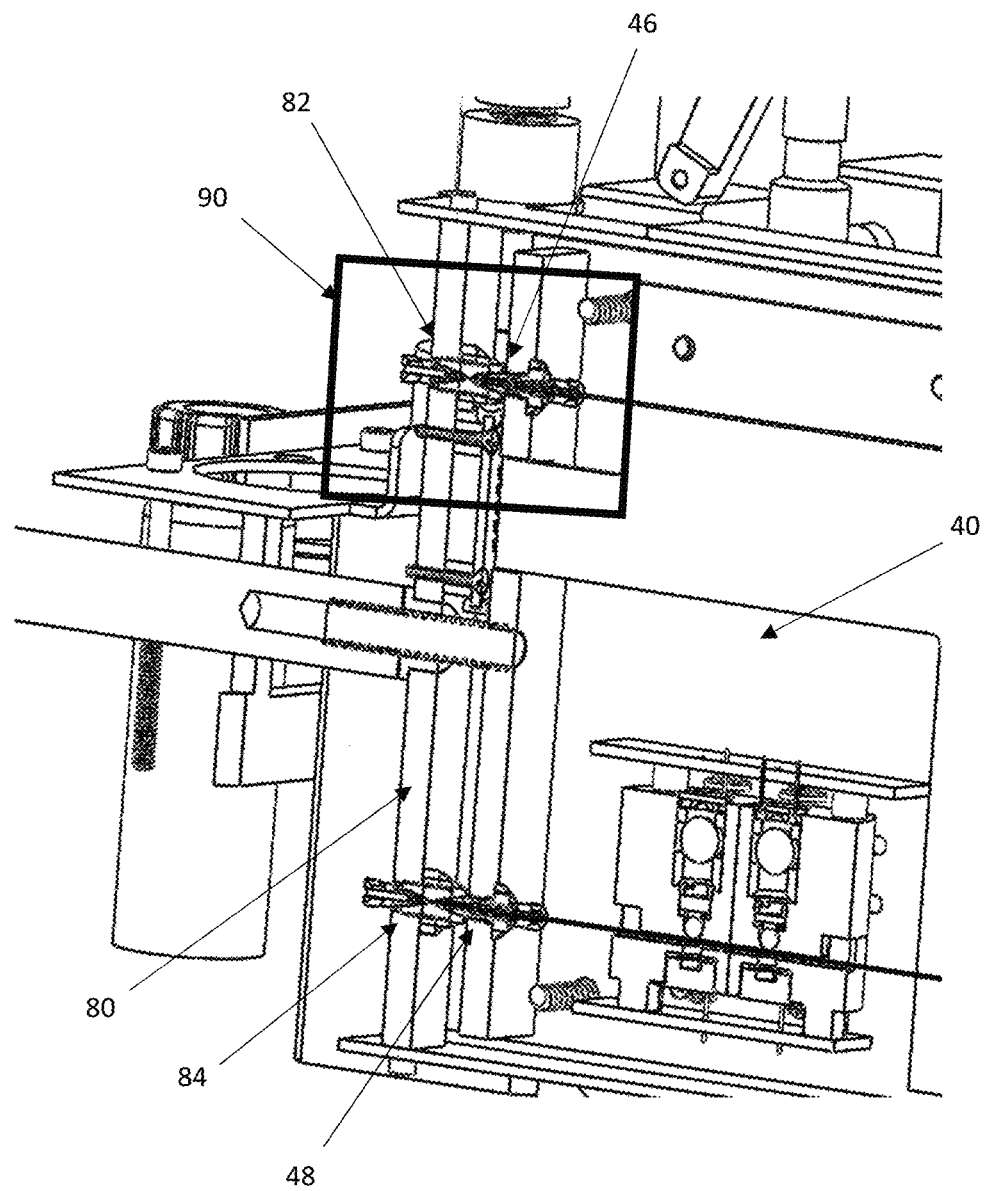
FIG. 7 is a cutaway view of the view shown in FIG. 6 to expose the ports.

FIG. 7 is the same perspective view as shown in FIG. 6, but in a cross-sectional view to thereby illustrate the module input port 46 and the module output port 48 of the module 40, and the output port 82 and the input port 84 of the connection dock 80. The box 90 is shown to be surrounding the output port 82 and the module input port 46. The area within box 90 is shown in a close-up view in FIG. 8. It should be understood that the hardware of the output port 82 and the module input port 46 are duplicated in the module output port 48 and the input port 84 and therefore do not need to be shown in detail.

Figure 8:
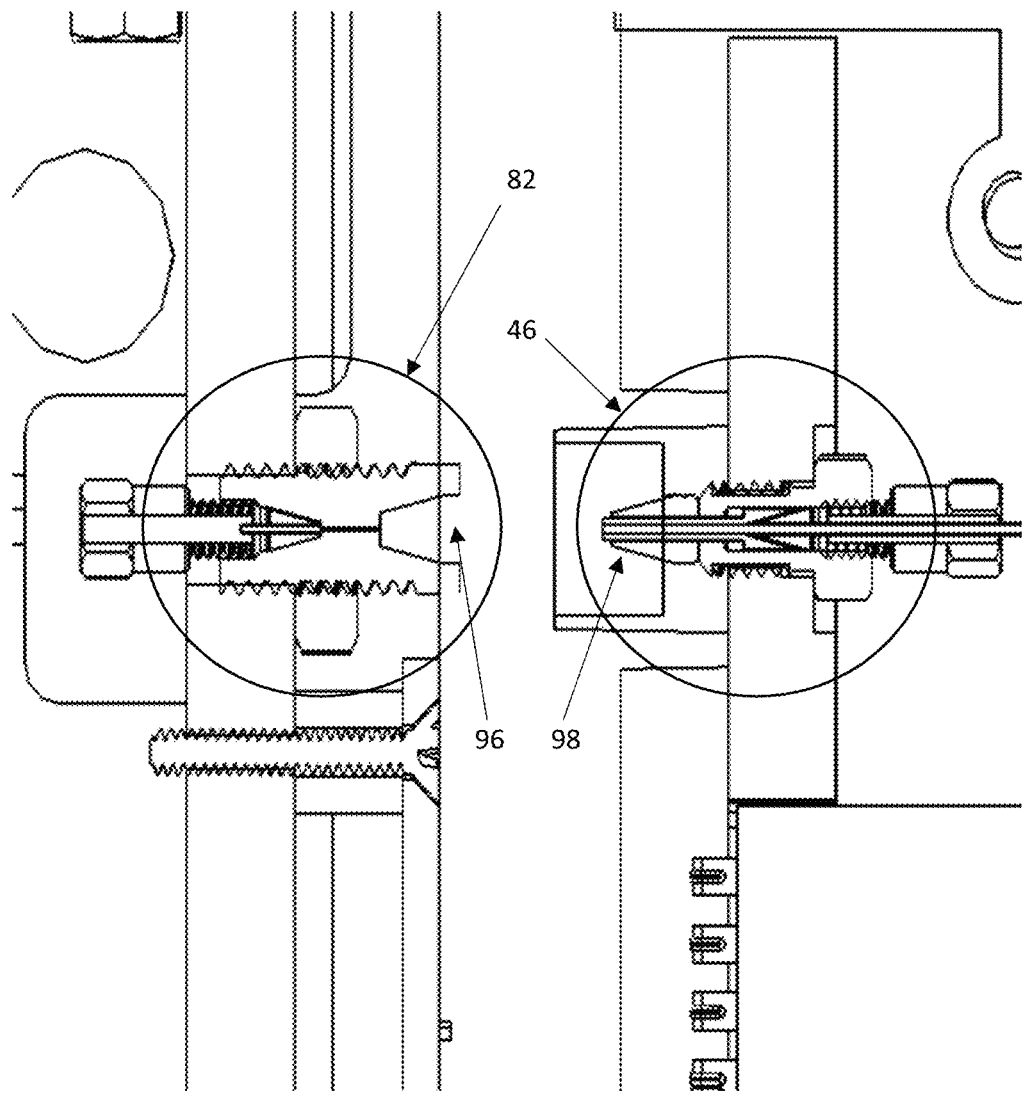
FIG. 8 is a close-up and cutaway view of a single port of the LC device and the module to show connection details before contact is made between a port on the LC device and a port on the module.

FIG. 8 is a close-up and cross-sectional view of a portion of the connection dock 80 of the LC device 38 and the connection end 42 of the module 40. Specifically, it shows the output port 82 before a connection is made to the module 40. FIG. 8 also shows a portion of the module 40, and specifically the module input port 46. In this embodiment of the invention, the output port 82 may include a frustoconical recess 96 forming a hollow cone. The module input port 46 may include a complementary frustoconical shape or protrusion 98 in the form of a truncated cone that matches the shape of the recess 96.

It is noted that the module input port 46 and the module output port 48 do not require a seal to prevent the leakage of fluid because of the small diameter of the ports. Any fluid remains in the ports until the module is brought into the press-fit connection with the LC device 38. By making the connection a tight form-fitting one, dead volume is reduced or eliminated.

Figure 9:
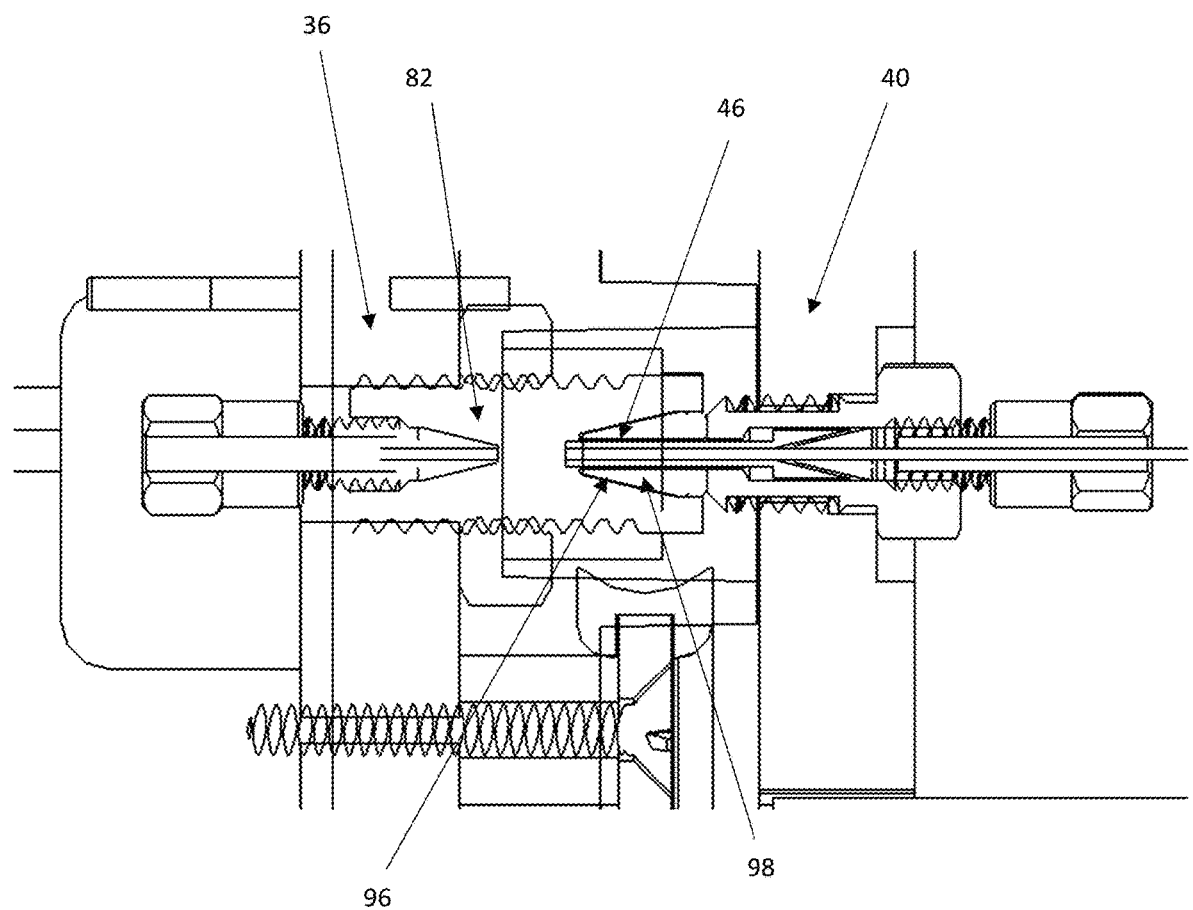
FIG. 9 is a close-up and cutaway view of FIG. 8 after the ports are in contact.

FIG. 9 is the same close-up cross-sectional view as shown in FIG. 8, but with the module input port 46 now in contact with the output port 82. More precisely, the protrusion 98 is disposed within the recess 96. It should be understood that it is enough for the module input port 46 to fit into the output port 82 for the module 40 to have a tight enough seal to function once a ratcheting mechanism has secured the module to the LC device.

In the embodiments of the invention, a ratcheting mechanism is provided to enable the module 40 to be secured to the LC device 38 in order to ensure a tight and leak-proof connection between the plugs in the ports 46, 48, 82 and 84.

Figure 10:
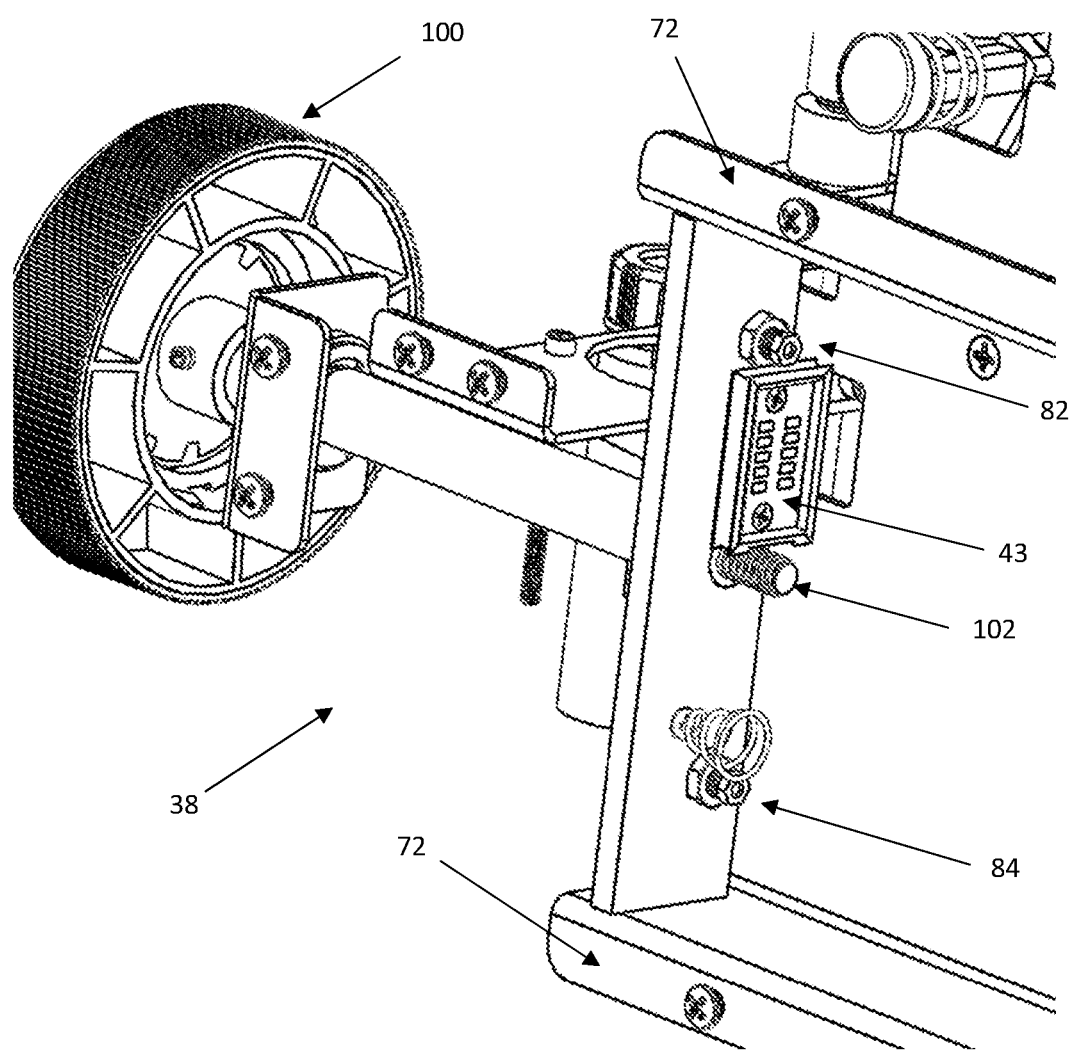
FIG. 10 is a perspective view showing detail of a ratcheting mechanism that enables a repeatable and damage-free connection between the LC device and the module.

FIG. 10 is a perspective view of a portion of the LC device 38, including guide rails 72, the output port 82, the input port 84, the electrical port 44, a knob 100 and a threaded screw 102 coupled to the knob.

Figure 11:
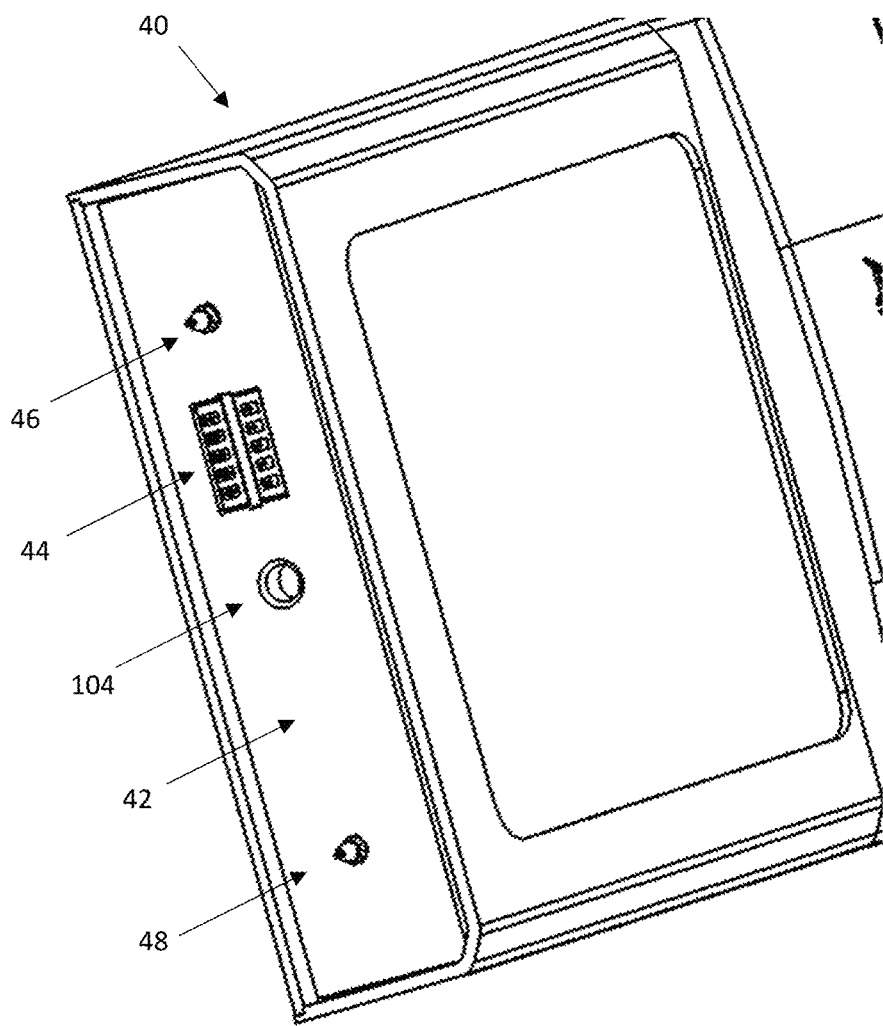
FIG. 11 is a perspective view of the outside of a module showing placement of a threaded hole for securing the module to the LC device to provide the proper seal.

The knob 100 may include a ratcheting mechanism. The ratcheting mechanism may enable the knob 100 to be turned and thereby turn the threaded screw 102. The threaded screw 102 may be threaded into a threaded hole in the connection end 42 of the module 40 as shown in FIGS. 6 and 11. The ratcheting mechanism in the knob 100 only enables the threaded screw 102 to progress into the threaded hole 104 using a predetermined force. Once that predetermined force has been applied when attaching the module 40 to the LC device 38, the ratcheting mechanism in the knob 100 will allow the knob 100 to continue to turn but will no longer allow the threaded screw to turn 102. However, when the knob 100 is turned in an opposite direction to remove the module 40, the threaded screw 102 is re-engaged by the knob 100 and will unscrew from the threaded hole 104.

Thus, after the predetermined force has been applied, the ports 46, 48, 82 and 84 in the module 40 and the LC device 38 are coupled and enable proper fluid flow between the LC device and the column 50 to perform LC measurements without damaging any of the ports.

FIG. 11 is a perspective view of the connecting end 42 of the module 40 that shows the module input port 46, the module output port 48, the electrical port 44 and the threaded hole 104 in the housing.

The embodiments of the invention above have all shown the LC device having an input port 84 and the module 40 having an output port 48. However, this port arrangement has been done for convenience only and is not a requirement of the invention. These ports were shown to enable the sample waste to be disposed of in the LC device. However, the sample waste could also stay within the module 40, eliminating the need for input port 84 or output port 48.

Figure 12:
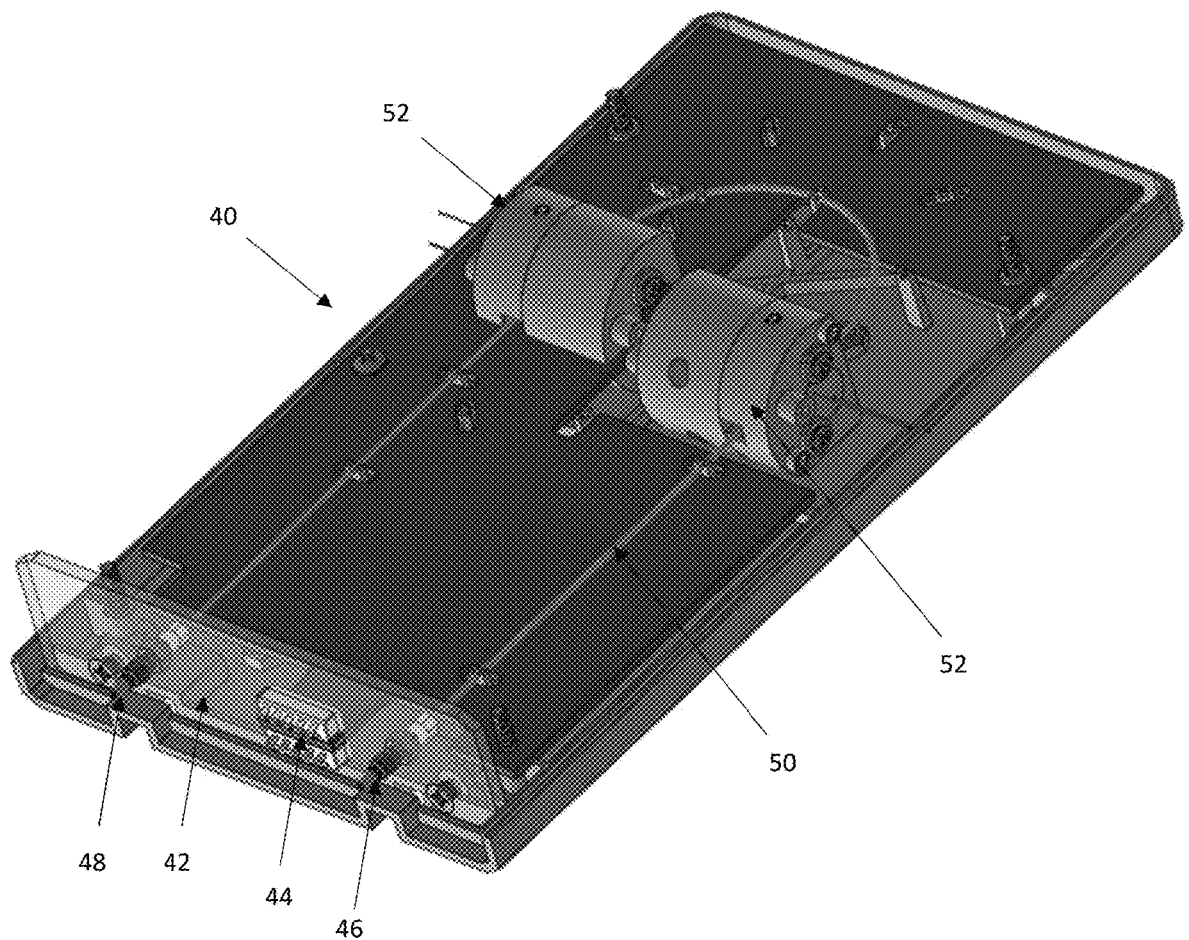
FIG. 12 is a same perspective view as shown in FIG. 4 but with a portion of the housing removed to illustrate a second embodiment for an arrangement of a column and two detectors for performing on-column detection, and connection ports.

FIG. 12 is a perspective view of a second embodiment of the present invention with the cover removed to show a second arrangement of components.

The specific arrangement of the column 50 and the detectors 52 is not limited to what is shown in the embodiments but may be altered as desired. One advantage of the module 40 is that any arrangement of a column 50 and detector 52 or detectors may be used in any desired configuration by simply swapping modules that are connected to the LC device 38.

For example, FIG. 5 shows two detectors 52 at the end of the column 50, whereas FIG. 12 shows detectors 52 at two different locations. The different modules will produce different measurements. It should also be understood that column 50 may refer to more than a single column in a module 40 in all embodiments of the invention. That is because even thought it appears that FIG. 12 shows a single column, a column may actually be separated into different columns with different packing materials in them as is known to those skilled in the art of liquid chromatography. Accordingly, all references to a single column 50 should be understood to refer to a physically single column and to multiple separate column segments that fit end-to-end in a module.

The electrical port 44 may be any standard press-fit type of connection that enables a secure electrical connection to be made when the module 40 is attached to the LC device 38. The electrical port 44 may provide power to a heater in the module 40 for heating the column 50. However, it should be understood that the heater is not a required component of the module 40, but is optional. The electrical port 44 may also provide power to the detectors 52 and function as a path for signals to be transmitted from the module 40 to the LC device 38.

While the embodiments above may describe a module for use with an LC on-column detection system, it should be understood that the module and connection system may be adapted for use with any measurement device that requires a secure connection for the flow of a fluid between different components and should not be considered as limited to the LC on-column detection system shown in FIGS. 3 through 12.

A summary of the embodiments of the invention is as follows. A first embodiment is a liquid chromatography (LC) system for separating, identifying and quantifying substances in a sample. The system comprised of two devices, an LC device and a module.

The LC device is comprised of a pump, a solvent and a sample, an injector for delivering the sample in the solvent, a connection dock for providing fluid ports to enable the injector to deliver the sample in the solvent to an output port, and a first electrical port.

The separate module that is attached to the LC device using a press-fit connection is comprised of a module input port for forming a press-fit connection to the output port and receiving the sample in the solvent, a second electrical port that is coupled to the first electrical port, a column coupled at a first end to the module input port for receiving the sample in the solvent, and at least one detector for performing on-column detection of substances in the sample in the solvent, wherein the column and detector perform separating, identifying and quantifying of substances, and wherein the results of separating, identifying and quantifying of substances are transmitted from the module to the LC device using the first and the second electrical port.

The LC system may be further defined as having the output port of the connection dock further comprising a normally open output port. Similarly, the module input port further comprises a normally open module input port.

More useful detail regarding the output port of the connection dock is that it further comprises a recess or recessed frustoconical cone, and the module input port further comprises a frustoconical protrusion that is complementary and form-fitting to the recess in the output port, wherein the output port and the module input port form a leak-free press-fit connection.

It is an important aspect to know that the LC system further forms a high pressure connection that is capable of withstanding pressures greater than 1000 psi. The LC system has been tested at pressures over 10,000 psi, and it is believed it may go higher.

The press-fit connection system is made possible using a knob and threaded screw. But first, to ensure that the connection is being made straight-on, there is at least one guide rail on the LC device for guiding the module when making the press-fit connection with the LC device, a ratcheting knob disposed in the LC device, and a threaded screw coupled to the ratcheting knob. The threaded screw is turned when the ratcheting knob is turned, and the threaded screw is disposed through the connection dock.

A threaded hole is also disposed in the connecting end of the module. Making sure that the threaded hole is aligned with the threaded screw of the LC device, the threaded screw is rotated through the threaded hole when the ratcheting knob is turned. The ratcheting knob prevents the threaded screw from turning when the output port of the connection dock is coupled to the module input port such that the sample in the solvent can travel from the LC device to the module.

There are some other aspects of the invention that should also be addressed. First, a detector is typically disposed in an LC device. In contrast, the embodiments of the invention illustrate the concept that both the column and one or more detectors may be disposed in the replaceable module. Thus, different detectors may be used with the same LC device and are no longer dependent on the detectors provided in the LC device for the different types of measurements that can be made.

It is another aspect that a column of any desired length may also be paired with any type of detector and disposed within a module. Thus, an LC device may now be easily and rapidly coupled with any desired combination of column length and one or more detectors using the module and the press-fit connection system of the embodiments of the invention.

Another aspect of the invention that has not been explained is that because of the recess and protrusion press-fit connection system of the embodiments of the invention, the embodiments are capable of operating at both low and high pressures. For example, the embodiments of the invention are capable of operating at pressures well above 1000 psi. Accordingly, the embodiments of the invention should be considered to operate as a low- and high-pressure LC system.

Another aspect of the embodiments is that different types of detectors may me disposed within a module. For example, the detectors of the embodiments should be considered to include but not be limited to UV absorption, fluorescence, electrochemical, electrical conductivity and refractive index detectors.

Another aspect of the embodiments of the invention is that each module may be include non-volatile memory. The non-volatile memory enables power to be removed from the module without losing the contents of the memory.

The contents of the memory in the module may be written to and read by the LC device or any other device that can make a proper connection to the electrical port 44. The contents of the memory in the module may include but should not be considered as limited to the length of the column, the type of column, the type of detector(s), the location of the detectors along the column, the number of times that the module has been used to make a measurement, and any other statistics that may be useful to a user of the module.

Another aspect of the embodiments of the invention is that the module may contain a column having multiple column segments.

Another aspect of the embodiments is that the modules have been shown having one or more detectors in the modules, but this is not required. In an alternative embodiment, the module may contain a column but not detectors. In that situation, the detectors may be disposed within the LC device. Thus, the module may contain a column and heater, but no detector.

While it may be obvious from the description above, it should still be stated that the size of the module and the LC system itself are relatively small. For example, the LC system may be portable and operated by a battery. Nevertheless, the LC system may also be a desktop system that still uses the same modules that may be used with a portable LC system. And while the module may be small, it is not a requirement of the LC system.

Figure 13:
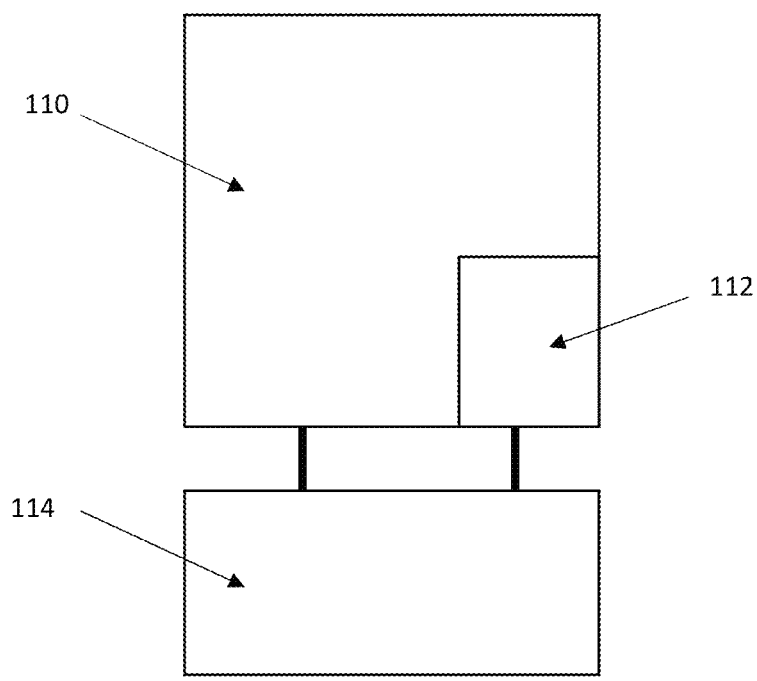
FIG. 13 is a block diagram of an alternative embodiment of the invention.

The embodiments above are all directed to an LC system that is divided into two separate components, an LC device and a module that together include all of the necessary elements to perform liquid chromatography. However, in an alternate embodiment shown in a block diagram in FIG. 13, the LC device 110 now contains the at least one detector 112 that previously has been shown to be located in the module. Thus, the new module 114 may only contain a column, and the detector or detectors 112 may be disposed inside the LC device 110 and adjacent to the input port. In this embodiment, the module 114 is only used for the purposes of separation of the sample in a column.

A summary of such a device might be as follows. It would be an LC device comprising a pump, a solvent and a sample, an injector for delivering the sample in the solvent, a connection dock for providing an output port to enable the injector to deliver the sample in the solvent to the output port, an input port for receiving the sample in the solvent from the module, and a first electrical port, and at least one detector for performing on-column detection of substances in the sample in the solvent.

A separate module would then be attached to the LC device using a press-fit connection, with the module comprising a module input port for forming a press-fit connection to the output port and receiving the sample in the solvent, a module output port for forming a press-fit connection to the input port and send the sample in the solvent to the LC device, a second electrical port that is coupled to the first electrical port, and a column coupled at a first end to the module input port for receiving the sample in the solvent.

Figure 14:
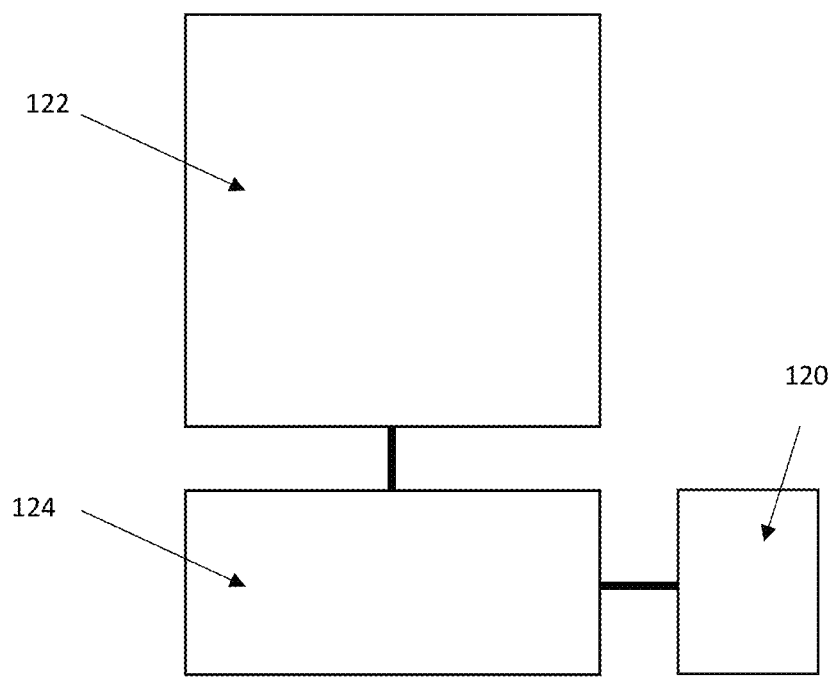
FIG. 14 is a block diagram of an another alternative embodiment of the invention.

Alternatively, as shown in FIG. 14, the at least one detector 120 may not be located within the LC device 122 or the module 124, but instead is separate from both of these devices 122, 124 and is now a third separate component of the LC system.

A summary of such a device might be as follows. It would be a liquid chromatography (LC) system, the system comprising an LC device comprised of a pump, a solvent and a sample, an injector for delivering the sample in the solvent, and a connection dock for providing an output port to enable the injector to deliver the sample in the solvent to the output port, and a first electrical port.

There would be a separate module that is attached to the LC device using a press-fit connection, the module comprised of a module input port for forming a press-fit connection to the output port and receiving the sample in the solvent, a module output port for sending the sample in the solvent, a second electrical port that is coupled to the first electrical port, a column coupled at a first end to the module input port for receiving the sample in the solvent.

There would then be at least one detector that is separate from the module but attached to the module output port using a press-fit connection, and for receiving the separated sample in the solvent, the at least one detector performing on-column detection of substances in the sample in the solvent, wherein the column and detector perform separating, identifying and quantifying of substances.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A liquid chromatography (LC) system, said system comprising:
    an LC device comprising:
        a pump, a solvent and a sample;
        an injector for delivering the sample in the solvent;
        a connection dock for providing an output port to enable the injector to deliver the sample in the solvent to the output port, and a first electrical port; and
    a separate module that is attached to the LC device using a press-fit connection, the module comprising:
        a module input port for forming a press-fit connection to the output port and receiving the sample in the solvent;
        a second electrical port that is coupled to the first electrical port;
        a column coupled at a first end to the module input port for receiving the sample in the solvent; and
        at least one detector for performing on-column detection of substances in the sample in the solvent, wherein the column and detector perform separating, identifying and quantifying of substances; and
    wherein the results of separating, identifying and quantifying of substances are transmitted from the module to the LC device using the first and the second electrical ports.

2. The LC system as defined in claim 1 wherein the LC system is further comprised of:
    the output port of the connection dock further comprising a frustoconical recess; and
    the module input port further comprising a frustoconical protrusion that is complementary to the recess in the output port, wherein the output port and the module input port form a leak-free press-fit connection.

3. The LC system as defined in claim 2 wherein the output port of the connection dock and the module input port further form a high-pressure connection that is capable of withstanding pressures greater than 1000 psi.

4. The LC system as defined in claim 3 wherein the LC system is further comprised of:
    at least one guide rail on the LC device for guiding the module when making the press-fit connection with the LC device;
    a ratcheting knob disposed in the LC device;
    a threaded screw coupled to the ratcheting knob, wherein the threaded screw is turned when the ratcheting knob is turned, and wherein the threaded screw is disposed through the connection dock; and
    a threaded hole in a connecting end of the module, wherein the threaded hole is aligned with the threaded screw of the LC device, wherein the threaded screw is rotatingly coupled to the threaded hole when the ratcheting knob is turned when the module is being connected to the LC device, and wherein the ratcheting knob enables proper force to be applied to make a leak-free connection such that the sample in the solvent can travel from the LC device to the module.

5. The LC system as defined in claim 1 wherein the LC system is further comprised of a battery disposed in the LC device for providing power to the module by sending power from the first electrical port to the second electrical port.

6. The LC system as defined in claim 1 wherein the LC system is further comprised of non-volatile memory disposed in the module, wherein the non-volatile memory stores data regarding operation of the module.

7. The LC system as defined in claim 1 wherein the LC system is further comprised of:
   an input port in the connection dock; and
   a module output port coupled to a second end of the column and to the input port of the connection dock, wherein the sample in the solvent is delivered from the module to the LC device after being separated in the column.

8. The LC system as defined in claim 1 wherein the at least one detector is further comprised of at least two detectors.

9. The LC system as defined in claim 1 wherein the at least one detector is selected from the group of detectors comprised of UV absorption, fluorescence, electrochemical, electrical conductivity and refractive index detectors.

10. The LC system as defined in claim 1 wherein the LC system is further comprised of a straight-on connection between the LC device and the module to facilitate a connection between the module input port and the output port of the LC device.

11. A method of performing liquid chromatography (LC) for separating, identifying and quantifying substances in a sample, said method comprising:
   providing an LC device comprising a pump, a solvent and a sample, an injector for delivering the sample in the solvent, a connection dock for providing fluid ports to enable to the injector to deliver the sample in the solvent to an output port, and a first electrical port, and
   providing a separate module that is attached to the LC device using a press-fit connection, the module comprising a module input port for forming a press-fit connection to the output port and receiving the sample in the solvent, a second electrical port that is coupled to the first electrical port, a column coupled at a first end to the module input port for receiving the sample in the solvent, and at least one detector for performing on-column detection of substances in the sample in the solvent, wherein the column and detector perform separating, identifying and quantifying of substances,
   performing LC by attaching the module to the LC device using the press-fit connection;
   injecting the sample in the solvent to the column in the module;
   separating the sample in the solvent;
   identifying substances in the sample in the solvent based on how the sample interacts with sorbent material in the column;
   quantifying the substances in the sample; and
   transmitting data regarding the substances from the module to the LC device using the first and the second electrical port.

12. The method as defined in claim 11 wherein the method further comprises:
   providing at least one guide rail on the LC device for guiding the module when making the press-fit connection with the LC device, a ratcheting knob disposed in the LC device, a threaded screw coupled to the ratcheting knob, wherein the threaded screw is turned when the ratcheting knob is turned, and wherein the threaded screw is disposed through the connection dock, and a threaded hole in a connecting end of the module;
   aligning the threaded hole with the threaded screw of the LC device;
   rotating the ratcheting knob to rotatingly couple the threaded screw to the threaded hole to attach the module to the LC device; and
   preventing the threaded screw from turning any more when the output port of the connection dock is coupled to the module input port such that the sample in the solvent can travel from the LC device to the module.

13. The method as defined in claim 12 wherein the method further comprises:
   providing a non-volatile memory in the module; and
   storing data in the non-volatile memory regarding components, arrangement of components of the module and operation of the module.

14. The method as defined in claim 13 wherein the method further comprises:
   providing an input port in the connection dock, and providing a module output port coupled to a second end of the column and to the input port of the connection dock; and
   delivering the sample in the solvent from the module to the LC device after being separated in the column.

15. The method as defined in claim 14 wherein the method further comprises sliding the module straight into the LC device when making the press-fit connection.

* * * * *